United States Patent
Payzer et al.

(10) Patent No.: US 10,348,795 B2
(45) Date of Patent: Jul. 9, 2019

(54) INTERACTIVE CONTROL MANAGEMENT FOR A LIVE INTERACTIVE VIDEO GAME STREAM

(71) Applicant: Microsoft Technology Licensing, LLC, Redmond, WA (US)

(72) Inventors: Gershom L. Payzer, Redmond, WA (US); Gregory M. Smith, Seattle, WA (US); Molly Rose Suver, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 15/655,558

(22) Filed: Jul. 20, 2017

(65) Prior Publication Data
US 2018/0290061 A1 Oct. 11, 2018

Related U.S. Application Data

(60) Provisional application No. 62/482,537, filed on Apr. 6, 2017.

(51) Int. Cl.
*G06F 17/00* (2019.01)
*H04L 29/06* (2006.01)
(Continued)

(52) U.S. Cl.
CPC .......... *H04L 65/608* (2013.01); *A63F 13/335* (2014.09); *A63F 13/497* (2014.09); *A63F 13/86* (2014.09); *G06F 13/38* (2013.01); *H04L 65/4069* (2013.01); *H04L 65/4092* (2013.01); *H04L 65/601* (2013.01); *A63F 13/87* (2014.09);
(Continued)

(58) Field of Classification Search
CPC .... H04L 65/608; H04L 65/4092; A63F 13/86; A63F 13/87; A63F 13/335; A63F 13/497; A63F 2300/572; G06F 13/38; H04N 5/268
See application file for complete search history.

(56) References Cited

U.S. PATENT DOCUMENTS 8,661,496 B2 2/2014 Perlman et al.
9,853,660 B1 12/2017 Gopal et al.
(Continued)

OTHER PUBLICATIONS

Choice Chamber—Gameplay Walkthrough Part 1—Live on Twitch with Facecam! (PC). Youtube.com. Online. Jun. 22, 2014. Accessed via the Intrent. Accessed Nov. 10, 2018. <URL: https://www.youtube.com/watch?v=khXvnr7yDrk>.*
(Continued)

*Primary Examiner* — Dmitry Suhol
*Assistant Examiner* — Carl V Larsen
(74) *Attorney, Agent, or Firm* — Klarquist Sparkman, LLP

(57) ABSTRACT

Technologies are described for enabling interactivity with video games by viewers of a live video game streaming service. For example, messages can be received indicating interactive control events initiated by remote viewers of a live interactive video game stream. A control state data structure can be maintained that comprises control state for the received interactive control events. The control state data structure can maintain separate control state for each of a plurality of time periods (e.g., each time period corresponding to one or more video frames). Actions in the video game can be activated based on the control state data structure.

17 Claims, 7 Drawing Sheets

(51) Int. Cl.
*G06F 13/38* (2006.01)
*A63F 13/335* (2014.01)
*A63F 13/497* (2014.01)
*A63F 13/86* (2014.01)
*H04N 5/268* (2006.01)
*A63F 13/87* (2014.01)

(52) U.S. Cl.
CPC ........ *A63F 2300/572* (2013.01); *H04N 5/268* (2013.01)

(56) References Cited

U.S. PATENT DOCUMENTS

| | | |
|---|---|---|
| 2002/0152219 A1 | 10/2002 | Singh |
| 2003/0038805 A1* | 2/2003 | Wong .................. A63F 13/12 345/473 |
| 2003/0083049 A1 | 5/2003 | Matthews |
| 2012/0115580 A1* | 5/2012 | Hornik .................. G07F 17/34 463/25 |
| 2012/0331502 A1 | 12/2012 | Mcintire et al. |
| 2014/0018165 A1 | 1/2014 | Kern et al. |
| 2014/0274368 A1 | 9/2014 | Cotter |
| 2015/0121437 A1 | 4/2015 | Tan |
| 2015/0201242 A1 | 7/2015 | Belton |
| 2015/0298007 A1 | 10/2015 | Agrawal et al. |
| 2015/0298010 A1 | 10/2015 | Trombetta et al. |
| 2017/0003784 A1* | 1/2017 | Garg .................. A63F 13/87 |
| 2017/0034237 A1 | 2/2017 | Silver |
| 2017/0072322 A1* | 3/2017 | Navok .................. A63F 13/86 |
| 2018/0004383 A1 | 1/2018 | Iwami et al. |
| 2018/0225537 A1* | 8/2018 | Cole .................. G06K 9/3233 |
| 2018/0295069 A1 | 10/2018 | Smith et al. |

OTHER PUBLICATIONS

How to: Interactive Minecraft Stream on Beam.pro. Youtube.com. Online. Jan. 18, 2016. Accessed via the Internet. Accessed Nov. 10, 2018. <URL: https://www.youtube.com/watch?v=2_9HPs5dJ7w>.*

"About Twitch", Retrieved on: https://web.archive.org/web/20170605010255/https://www.twitch.tv/p/about, Retrieved on: Jun. 5, 2017, 3 Pages.

"Blizzard Streaming", Retrieved From: https://us.battle.net/support/en/article/7783, Retrieved on: Jun. 5, 2017, 11 Pages.

"Get started with You Tube Gaming", Retrieved From: https://support.google.com/youtubegaming/answer/6213241?hl=en&ref_topic=6213253, Retrieved on: Jun. 5, 2017, 2 Pages.

"The Rough and Dirty Guide to Getting Started on StreamMe!", Retrieved From: https://www.stream.me/pages/getting-started, Retrieved on: Jun. 5, 2017, 5 Pages.

"Non Final Office Action Issued in U.S. Appl. No. 15/628,512", dated Jun. 1, 2018, 14 Pages.

C., Dave, "Twitch MultiStreaming", Retrieved From: https://twitchfan.wordpress.com/, Nov. 3, 2014, 3 Pages.

PR Newswire, "Genvid Releases Revolutionary Interactive Streaming Technology for eSports Broadcasts," <http://www.prnewswire.com/news-releases/genvid-releases-revolutionary-interactive-streaming-technology-for-esports-broadcasts-300391171.html> 4 pages (Jan. 18, 2017).

Michaels, Chris, "Latency Matters in Online Gaming", https://www.wowza.com/blog/latency-matters-in-online-gaming, Published on: Mar. 7, 2017, 5 pages.

Johnson, Eric, "Watch This (and Play Along): Interactive Streaming Puts the Power in Viewers' Hands", https://www.recode.net/2014/5/5/11626464/watch-this-and-play-along-interactive-streaming-puts-the-power-in, Published on: May 5, 2014, 3 pages.

Zhang, et al., "On Crowdsourced Interactive Live Streaming: A Twitch.TV-Based Measurement Study", In Proceedings of 25th ACM Workshop on Network and Operating Systems Support for Digital Audio and Video, Mar. 20, 2015, 7 pages.

"Genvid Releases Revolutionary Interactive Streaming Technology for eSports Broadcasts", http://www.fox34.com/story/34290347/genvid-releases-revolutionary-interactive-streaming-technology-for-esports-broadcasts, Jan. 18, 2017, 2 pages.

"Non Final Office Action Issued in U.S. Appl. No. 15/628,327", dated Nov. 30, 2018, 7 Pages.

* cited by examiner

SOFTWARE 680 IMPLEMENTING DESCRIBED TECHNOLOGIES

INTERACTIVE CONTROL MANAGEMENT FOR A LIVE INTERACTIVE VIDEO GAME STREAM

CROSS REFERENCE TO RELATED APPLICATIONS

This application claims the benefit of U.S. Provisional Application No. 62/482,537, filed Apr. 6, 2017, which is hereby incorporated by reference.

BACKGROUND

Game streaming services provide live video game streaming to viewers via the Internet. With some game streaming services, the viewers can chat with the user playing the game and with other viewers. While chatting provides a limited form of interaction with the game streamer, there are significant limitations. For example, the viewers may not have the ability to interact with or influence the gameplay.

Therefore, there exists ample opportunity for improvement in technologies related to providing interactivity for video game streaming services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for enabling interactivity with video games by viewers of a live video game streaming service. For example, messages can be received indicating interactive control events initiated by remote viewers of a live interactive video game stream. A control state data structure can be maintained that comprises control state for the received interactive control events. The control state data structure can maintain separate control state for each of a plurality of time periods (e.g., each time period corresponding to one or more video frames). Actions in the video game can be activated based on the control state data structure.

As another example, messages can be received indicating interactive control events initiated by remote viewers of a live interactive video game stream. A control state data structure can be maintained that comprises control state for the received interactive control events. The control state data structure can maintain separate control state for each of a previous video frame, current video frame, and next video frame. Interactive control events can be added to the control state data structure for the next video frame. Actions in the video game can be activated based on the control state data structure.

As described herein, a variety of other features and elements can be incorporated into the technologies separately and/or in combination.

DETAILED DESCRIPTION

Overview

Figure 1:
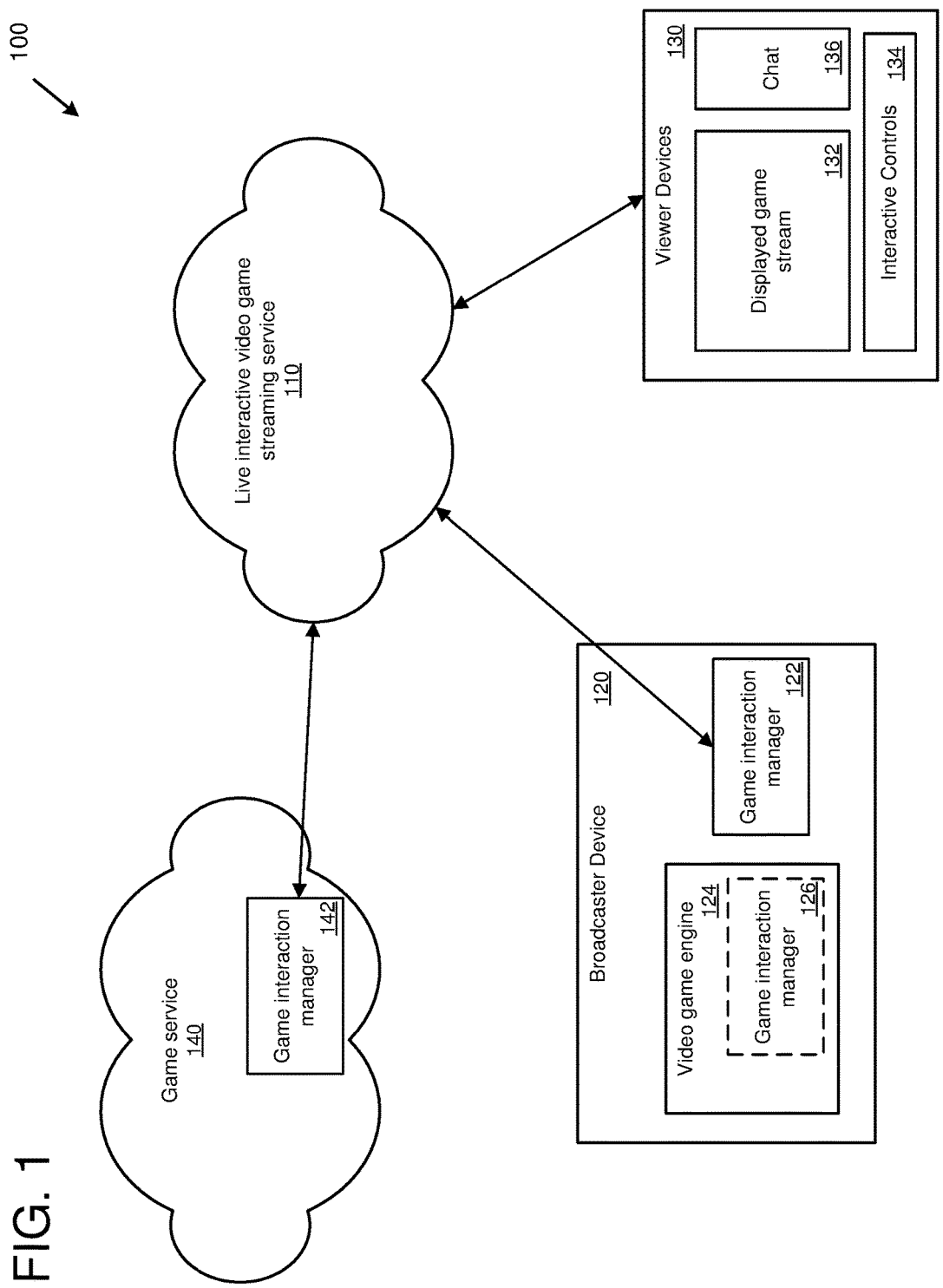
FIG. 1 is diagram depicting an example live video game streaming environment.

As described herein, various technologies are provided for enabling interactivity with video games by viewers of a live video game streaming service. The live video game streaming service is a service in which a broadcaster plays a video game (e.g., on the broadcasters computing device) which is then streamed live to a number of viewers (e.g., tens, hundreds, thousands, or more). The live video game can be streamed by a streaming service (e.g., a cloud-based streaming service operating as a web site). The viewers of the live video game stream can interact with the video game, and control aspects of gameplay, in a variety of ways. For example, the viewers can drop items in the game (e.g., weapons, armor, power-ups, etc.), control choices (e.g., tell the broadcaster which direction to go, or which action to take, in the game), take control of the broadcaster's avatar and/or other game characters, etc. One example of a live video game streaming service is the Mixer interactive livestreaming service provided by Microsoft® (previously the Beam service).

In order to support the live interactivity, the live video game streaming service operates with very low latency (e.g., sub-second latency, such as much lower than one second). Operating with very low latency allows the viewers to interact in real-time with the video game as the broadcaster is playing, and have their interactions occur in synchronization with the gameplay. For example, if the broadcaster is playing a game in which their avatar has a choice of taking paths to the left or the right, then a viewer could activate a command to direct the broadcaster to take one of the paths in real-time. Operating with very low latency makes the interaction effective and enhances the interaction experience of the viewers (e.g., with higher latency if the broadcaster had already taken one of the paths then the viewer's interaction would not work). Sub-second latency allows broadcaster to communicate in real-time, and the viewers to respond in real-time.

Various types of interactivity can be provided within the live video game streaming service environment. For example, the viewers can be provided with interactive controls (e.g., buttons, joysticks, gamepad controls, or other interactive controls) that can be activated to affect the video game, such as spawning enemies in the video game, dropping power-ups, creating in-game items (e.g., weapons, armor, etc.), increasing player health, taking control of the broadcaster's player in the game, and taking control of another character in the game. Examples of interactive controls include buttons that the viewers can press, joysticks or directional controls that the user can move in various directions, and checkboxes that the user can check. Custom interactive controls can be provided as well. For example, a particular video game can support a map control that displays a map where the viewers can click on the map to perform some action (e.g., to drop a bomb on the selected point on the map).

A set of interactive controls can be provided for display to the viewers. The set of interactive controls, also called a scene, can include buttons, joysticks, checkboxes, custom interactive controls, etc. All viewers of the live interactive video game stream can be provided the same set of interactive controls and/or interactive controls can be customized based on specific viewers and/or groups. For example, a set of interactive controls can be viewer specific (e.g., a specific viewer can be provided a specific scene) or group specific (e.g., a specific group of viewers can be provided a specific scene).

Live Video Game Streaming Environment

In the technologies described herein, an environment can be provided to support live video game streaming. For example, various computing devices and computing services can provide a live interactive video game streaming service web site that communicates with broadcasters to receive interactive video game streams and communicates with viewers to provide the interactive video game streams.

FIG. 1 is a diagram 100 depicting an example live video game streaming environment. In the diagram 100, a live interactive video game streaming service 110 provides live interactive video game streaming allowing viewers using viewer devices 130 to view and interact with video games being played by broadcasters using broadcaster devices 120. The live interactive video game streaming service 110 can include various types of computer hardware and software (e.g., servers, web hosting software, streaming software, web server software, cloud computing resources, etc.). In some implementations, the live interactive video game streaming service 110 operates as a web site where the viewers can browse various live video game streams, view a selected live video game stream, and interact in real-time with the video game being played.

In the diagram 100, a broadcaster device 120 is used by a broadcaster to live stream a video game. The broadcaster device 120 can be a desktop computer, laptop computer, or another type of computing device.

Using the broadcaster device 120, the broadcaster plays the video game and streams it live to the viewer devices 130 via the live interactive video game streaming service 110. In some implementations, the video game is running locally on the broadcaster device 120, as indicated by the video game engine 124. In some implementations, running the video game involves communication by the broadcaster device 120 with an external or remote video game service 140 (e.g., when playing an online and/or multiplayer video game). In some implementations, the video game is running on a computing device (not depicted) that is separate from the broadcaster device 120, such as a gaming console. For example, the broadcaster device 120 can obtain the game stream from the separate computing device (e.g., from the gaming console) via a network or a video capture device.

A game interaction manager (e.g., game interaction manager 122, 126, and/or 142) manages interaction with the video game. For example, the game interaction manager can maintain the control state (e.g., control state data structures) of the various interactive controls (e.g., received as control events from the viewer devices 130 via the live interactive video game streaming service 110), communicate using a protocol that communicates control events and that supports switching communication modes, and/or supports co-streaming among a number of broadcasters. The game interaction manager 122 can run on the broadcaster device 120 (e.g., as part of a software component or software development kit that is associated with the live interactive video game streaming service 110). The game interaction manager 126 can also run as a part of the video game engine 124. The game interaction manager 142 can also run as part of the game service 140. In some implementations, only one or more instances of the game interaction manager are present (e.g., just game interaction manager 122). In some implementations, the interaction manager is called the Mixer manager.

State Management for Interactive Control Events

In the technologies described herein, interactivity with video games by viewers of a live video game streaming service is supported using state management for interactive control events. For example, state management can be performed at the broadcaster (e.g., by the game interaction manager) and/or within the video game engine. State management can be implemented in software and/or hardware. In some implementations, state management is performed, at least in part, by an SDK. The SDK is computer software that can be utilized (e.g., by the game developer and broadcaster) to support live interactivity with the live video game streaming service. For example, the SDK can include software tools that provide for management of events from viewer devices (e.g., receiving and processing interactive controls) that support live interactivity with video games. In some implementations, the game interaction manager (e.g., game interaction manager 122, 126, and/or 142) is implemented as part of an SDK associated with the live interactive video game streaming service 110.

State management can be used to manage the state of the various interactive controls supported by the live interactive video game. Examples of interactive controls that can be managed using state management include buttons, joysticks, checkboxes, custom controls (e.g., maps), and/or any other type of interactive control.

In some implementations, control state is maintained on a per-frame basis. For example, a first set of control state data (e.g., called a snapshot) can be maintained for the previously displayed video frame of the video game, a second snapshot can be maintained for the currently displayed video frame of the video game, and a third snapshot can be maintained for the next video frame to be displayed for the video game. Each snapshot can store data using one or more data structures (e.g., a first snapshot for a previously displayed frame that stores state data for the previously displayed frame in a first data structure or data structures, a second snapshot for a currently displayed frame that stores state data for the currently displayed frame in a second data structure or data structures, and a third snapshot for a next video frame that stores state data for the next video frame in a third data structure or data structures). In some implementations, state is synchronized to a frame and state only changes on a video frame basis.

In some implementations, control state is maintained for three frames, a previous frame (the last frame displayed), a current frame (the current frame being displayed), and a next frame (the in-progress frame to be displayed next). The SDK can represent this in any number of ways, such as three ButtonState Dictionaries for previous, current, and next frame, or one Dictionary with extra members on the ButtonState class like PreviousIsDown, CurrentIsDown, NextIsDown, etc.

In some implementations, control state is maintained on a time interval basis, which could correspond to a single frame (e.g., $1/30^{th}$ of a second), to a group of frames (e.g., a time interval corresponding to 3 frames), or to some other time interval (e.g., a tenth of a second). For example, a first set of control state data (e.g., called a snapshot) can be maintained for the previous time interval of the video game (e.g., a previous group of three frames), a second snapshot can be maintained for the current time interval of the video game (e.g., a current group of three frames), and a third snapshot can be maintained for the next time interval to be displayed for the video game (e.g., a next group of three frames). Each snapshot can store data using one or more data structures (e.g., a first snapshot for a previous time interval that stores state data for the frames displayed in the previous time interval in a first data structure or data structures, a second snapshot for a current time interval that stores state data for the frames currently being displayed in a second data structure or data structures, and a third snapshot for a next time interval that stores state data for frames that will be displayed next in a third data structure or data structures). In some implementations, state is synchronized to a time interval and state only changes on a time interval basis. In some implementations, the time interval is user-configurable. For example, the broadcaster could set the time interval (e.g., set to a number of milliseconds or a fraction of a second).

In some implementations, control state is maintained for three time intervals, a previous time interval (the last time interval displayed), a current time interval (the current time interval being displayed), and a next time interval (the in-progress time interval to be displayed next). The SDK can represent this in any number of ways, such as three ButtonState Dictionaries for previous, current, and next time intervals, or one Dictionary with extra members on the ButtonState class like PreviousIsDown, CurrentIsDown, NextIsDown, etc.

In some implementations, control state is maintained based on video frame types (for either individual frames or time intervals). For example, control state can be maintained on the basis of rendering frames, input frames, and/or physics frames. In some implementations, the default is to use input frames. In some implementations, the type of frame to use is a user-configurable setting. For example, a broadcaster could select between rendering, input, or physics frames for maintaining control state (e.g., in addition to setting a time interval).

In some implementations, the application programming interface (API) layer can only read the state data, and the message handler is the only writer. In some implementations, if a requested control does not exist, a valid result is still returned (e.g., a result indicating that a button control is not pressed) instead of returning an error. By not returning an error even if the control does not exist, programming errors and software problems (e.g., crashes) can be reduced or eliminated. For example, the developer does not have to write code to check if a given control exists before trying to access the control (e.g., before calling a control state API).

In some implementations, the state is maintained in a data structure. The data structure can be quickly indexed (e.g., a Dictionary in the C# programming language or a map in JavaScript). Multiple data structures can be used for faster indexing (e.g., a data structure can be indexed by viewer participant and another data structure can be indexed by control for faster lookup). Data structures can have aggregated columns. For example, aggregating data can be used to maintain counts of buttons so the counts do not need to be computed when the developer calls the API to access the data. Due to the data structure design, the data can be queried using almost any index. For example, if the state of a control needs to be determined, the state can be obtained by requesting the state of the control by a specific viewer, by requesting all of the viewer's controls at once, or by the state of the viewer itself.

For example, a data structure for the control state of a button control (e.g., ButtonState dictionary) could have the following members:
Control ID (index)
IsDown
IsPressed
IsUp
CountOfDown
CountOfPress
CountfOfUp As another example, a data structure for the control state of a joystick control (e.g., JoystickState dictionary) could have the following members:
Control ID (index)
X-position
Y-position The following is an example implementation describing processing operations that are performed when a viewer presses and releases a control button. For example, the operations can be performed within the game interaction manager (interaction manager), which could be game interaction manager 122 running on broadcaster device 120.

1. Receive an event from the game service (e.g., from the live interactive video game streaming service 110) that says the viewer (e.g., a viewer of one of viewer devices 130) performed a mousedown on an interactive control button (e.g., the viewer clicked, tapped, or otherwise selected the graphical button displayed in a graphical user interface).
   a. In response to the event, interaction manager updates the button state as follows for the particular button that was pressed. The button state is updated for a next video frame (e.g., a snapshot of control state associated with the next video frame), which is called the NextButtonState in this example.
      i. IsDown=true
      ii. IsPressed=true
      iii. IsUp=false
      iv. CountOfPressed++
      v. CountOfDown++

2. The interaction manager receives a frame event from the video game (the video game is switching to the next video frame).
   a. In response, the interaction manager moves the control state:
      i. NextButtonState to CurrentButtonState (the current button state now contains the first mousedown button state that was created in step 1)
      ii. CurrentButtonState to PreviousButtonState
      iii. Clear NextButtonState (or just overwrite with new data)

3. Receive a mouseup event from the game service for the interactive control button.
   a. In response to the event, interaction manager updates the button state as follows for the particular button that was pressed. The button state is updated for a next video frame.
      i. IsDown=false
      ii. IsPressed=false
      iii. IsUp=true
      iv. CountOfUp++
      v. Clicked=true The above example implementation depicts an example of how the control state is managed and stored for a particular button that is pressed (the mousedown event) and then released (the mouseup event). In real world situations, there will typically be more interactive controls and many more events. For example, many users may press the same button within the timeframe of a frame (which would lead to the CountOfPressed and CountOfDown being incremented accordingly) and/or press different interactive buttons or controls (which would lead to updating the interactive control state similarly to step 1a above for the other interactive buttons or controls.

The interactive control events influence actions that are performed in relation to the video game. For example, a particular interactive control could be a button that drops an item (e.g., a power-up) in the video game. In some implementations, interactive controls that are activated once per button press, such as the button that drops the item, are performed upon the mouseup event. This prevents the viewer from holding down the button for multiple activations. For example, if a mousedown event and a mouseup event are received for the button and added to the next frame button state, then when the video game switches to the next frame, the action associated with the button will be performed in the video game (e.g., the power-up will be dropped).

Other types of interactive controls can be performed based on different events. For example, a button that fires a weapon can be performed upon a mousedown event and continue until a corresponding mouseup (e.g., over a sequence of video frames or other time interval). For example, a mousedown event that is received for the fire weapon button is added to the next video frame button state. Once the video game switches to the next video frame, and the next video frame button state is moved to the current video frame button state, then the weapon will begin firing in the video game. This will continue until a mouseup event is received (which could occur on the next video frame or on some other video frame in the future).

Game developers typically check the state of the interactive controls (e.g., by querying the interaction manager) at the beginning of each video frame to determine which controls to perform in the game for the video frame. However, game developers could check at any time.

Control state can be aggregated. For example, if a single instance of a given button state is maintained, it can store state information from multiple viewers (e.g., using the counts for down, pressed, up, etc.). Button state can also be maintained on an individual viewer basis and/or for a group of users. For example, each viewer can have its associated button state which can be individually queried. Aggregation can also be performed in other ways. For example, a single instance of a given joystick control can aggregate input values for multiple viewers (e.g., using weighted averages).

In some implementations, specific viewers are selected for associating with specific interactive controls. For example, a single viewer could be selected by the broadcaster for controlling an in-game character and as a result specific interactive control events could be limited to just the single viewer.

In some implementations, event state is maintained for a live interactive video game streaming service by performing one or more of the following operations. For example, the operations can be performed by a game interaction manager (e.g., game interaction manager 122, 126, and/or 142). The operations can include operations for receiving (e.g., by the game interaction manager) messages (e.g., messages communicated using, at least in part, the WebSockets network protocol) that can arrive at any time from the viewer devices via the live interactive video game streaming service (also called the streaming service). The messages can represent interactive control events (e.g., button presses, game controller or joystick movements, etc.). The operations can include processing the received messages to place them in a data structure, or adjust data in a data structure (e.g., incrementing counts), in association with a specific video frame state (e.g., next, previous, or current frame state) or other time interval. The operations can include receiving a next frame event (e.g., from a video game engine) and in response processing the data structure to re-associate the data with the appropriate frame (e.g., move current frame data to previous frame data, move next frame data to current frame data, etc.).

Figure 2:
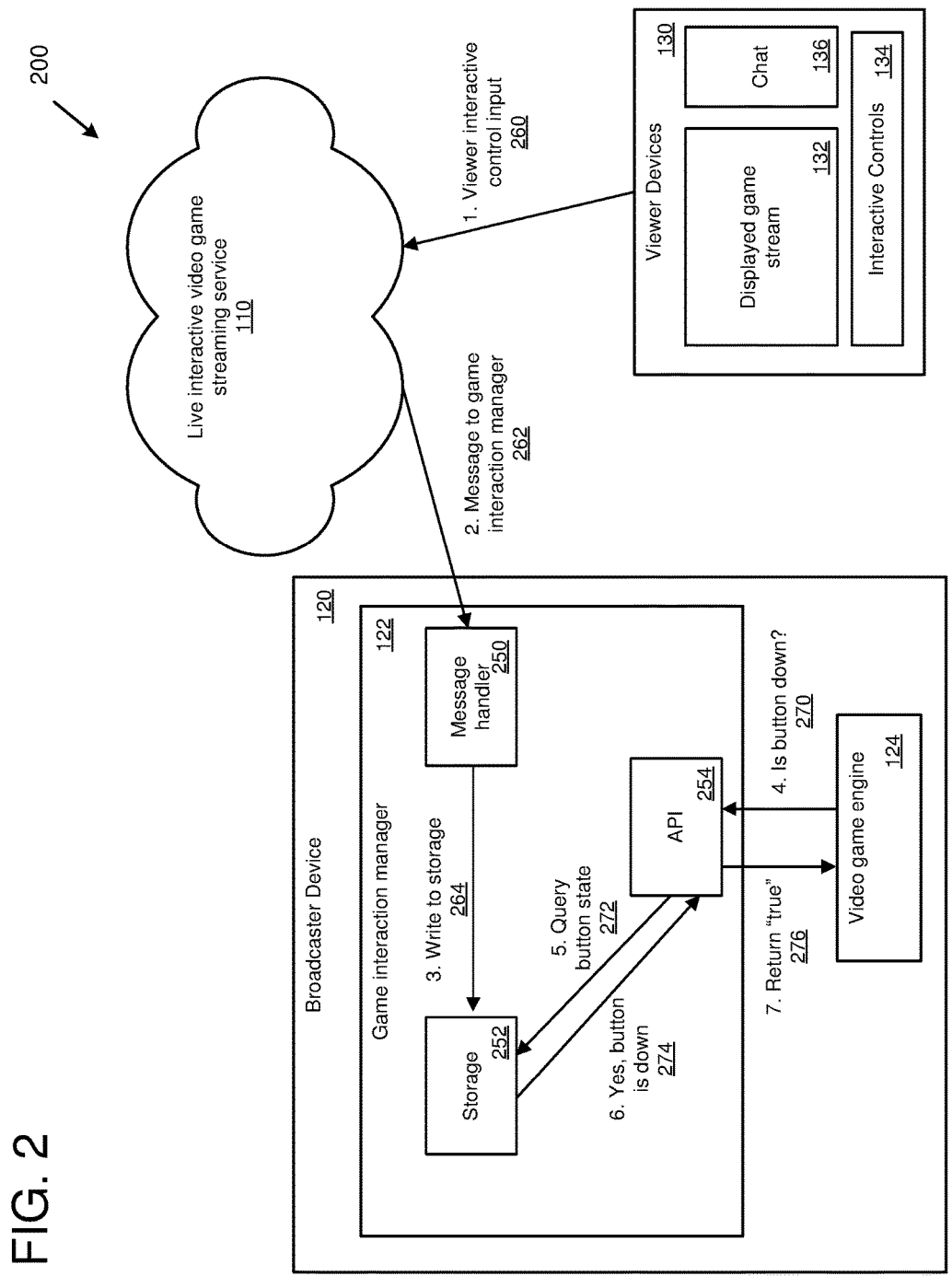
FIG. 2 is diagram depicting an example message flow within a live video game streaming environment.

FIG. 2 is a diagram 200 depicting an example message flow within a live video game streaming environment. The diagram 200 depicts the example message flow in relation to some of the elements depicted in FIG. 1. Specifically, the diagram 200 depicts an example message flow between the viewer devices 130, the live interactive video game streaming service 110, and the broadcaster device 120.

As depicted in diagram 200, one of the viewer devices 130 sends a message to the live interactive video game streaming service 110 indicating an interactive control event (in this example the interactive control event is a button press), as indicated at 260. In response, the live interactive video game streaming service 110 sends a message to the game interaction manager 122 running on the broadcaster device 120, as indicated at 262. The message is received by a message handler 250 and stored in the storage 252, as depicted at 264. For example, the storage 252 can store the message in a control state data structure on a time interval basis and/or on a frame basis. The control state stored in the storage 252 can be queried via an API 254 in communication with the video game engine 124, as depicted at 270 and 272, and the state information can be returned, as depicted at 274 and 276. For example, at the start of displaying a new video frame, the video game engine 124 can query the API 254 for each of a number of interactive controls and perform actions in the video game accordingly.

Figure 3:
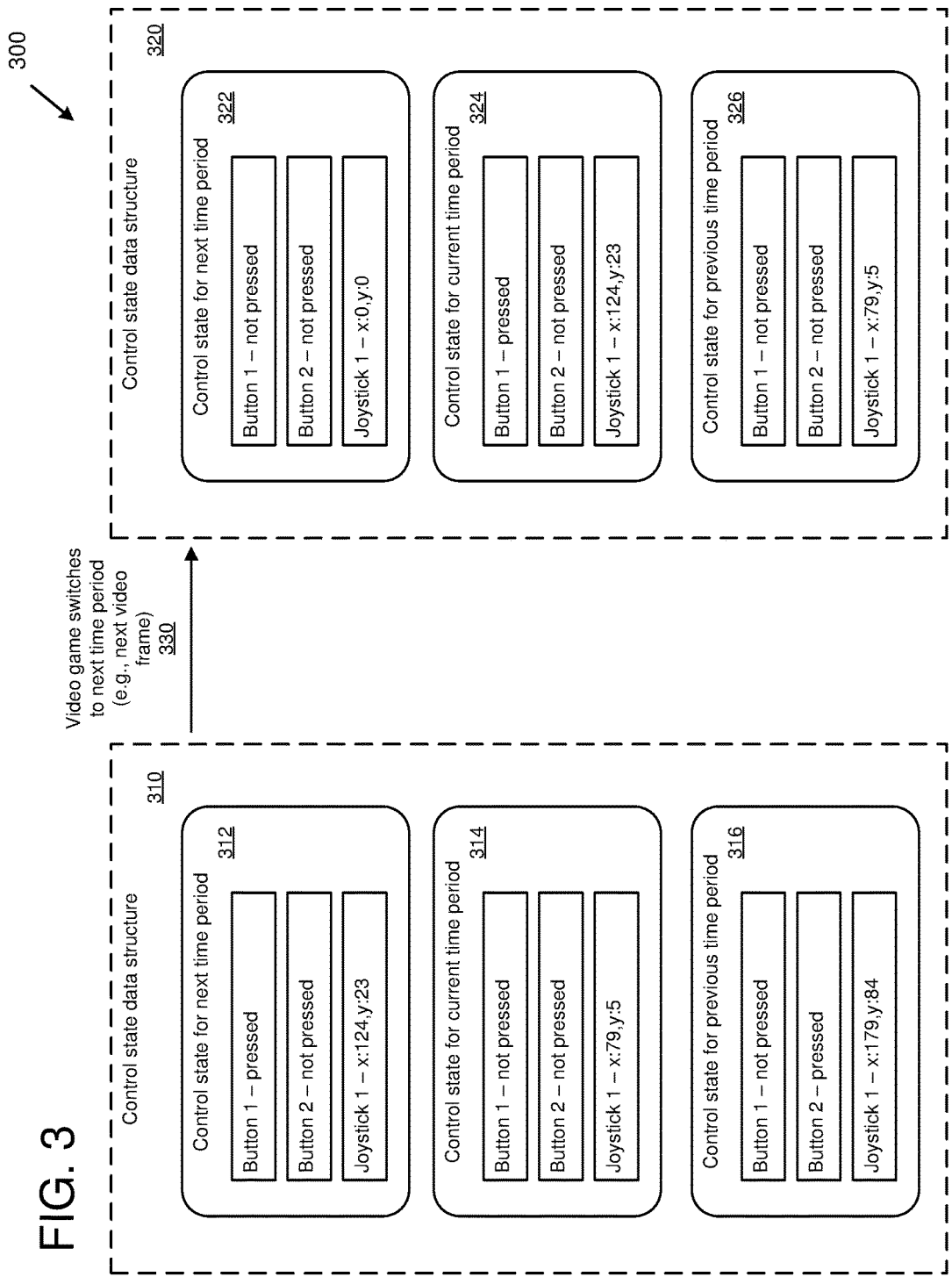
FIG. 3 is diagram depicting an example of managing control state data structures over different time periods.

FIG. 3 is diagram 300 depicting an example of managing control state data structures. The diagram 300 illustrates control state management for interactive controls in which collections of control state are maintained for each of a plurality of time periods, including a next time period, a current time period, and a previous time period. For example, time periods can represent single consecutive video frames (a next video frame, a current video frame, and a previous video frame), groups of video frames, or video frames based on another time period.

The diagram 300 depicts the control state data structure 310 as it appears at a specific point in time (e.g., while the video game is displaying a specific video frame). The control state data structure 310 contains collections of control state for the interactive controls (in this example, there are three interactive controls, two buttons and a joystick) for each time period. Specifically, in this example, the control state for the next time period 312 (e.g., a snapshot of control state for the next time period) stores control state data for the three interactive controls. In the control state for the next time period 312, Button 1 has been pressed (e.g., a mousedown event has been received, an IsPressed flag has been set to true, and corresponding counts have been increased), Button 2 has not been pressed, and Joystick 1 has specific x and y coordinates (e.g., a joystick event has been received and the x and y coordinates have been set).

The control state for the current time period 314 (e.g., a snapshot of control state for the current time period) stores control state data for the three interactive controls. The current time period is used to perform actions in the video game. In the control state for the current time period 314, Button 1 has not been pressed, Button 2 has not been pressed, and Joystick 1 has specific x and y coordinates. For example, based on the control state for the current time period 314, a character in the video game can be moved based on the Joystick 1 x and y coordinates.

The control state for the previous time period 316 (e.g., a snapshot of control state for the current time period) stores control state data for the three interactive controls. The previous time period reflects the control state that used to be in the current time period but has now been moved to the previous time period. The previous time period can be used to determine what happened in the past as well as to determine the current state. For example, because Button 2 was pressed in the control state for the previous time period 316 and Button 2 was not pressed in the control state for the current time period 314, the control state for Button 2 in the current time period can be set to clicked (e.g., IsClicked=true).

As indicated at 330, the video game has switched to the next time period (e.g., to the next video frame). As a result of switching to the next time period, the control state has been moved (from the control state for the current time period 314 to the control state for the previous time period 326, from the control state for the next time period 312 to the control state for the current time period 324, and the control state for the next time period 322 has been cleared). After the switch, the control state data structure 310 has been transformed into the control state data structure 320. The control state for the next time period 322 has been cleared and initialized with default values (e.g., buttons not pressed, joysticks set to 0,0). As new interactive control events come in, the control state for the next time period 322 can be updated.

As a result of the switching, the control state for the current time period 324 will be used to perform actions in the video game. For example, pressing Button 1 could cause the video game to fire a weapon or perform some other action.

State Initialization

In the technologies described herein, control state can be initialized. For example, control state for interactive controls can be initialized to a value that will not return an error if queried (e.g., by the broadcaster). As an example, button state variables such as isDown, isUp, and isPressed can be initialized to a value such as "false" which is a valid value that will not cause an error if the button state is queried before any events have been received for the particular button.

Initializing control state to values that will not cause errors can avoid errors and crashes. For example, if a button state is initialized to a value that is not valid, then querying the button state can result in an error or crash. However, if the button state is initialized to a value such as "false," then querying the button state will return a valid result that will not cause an error or other problem.

For example, software code (e.g., written by the broadcaster or game developer) can perform a query for a specific interactive control (e.g., for a button that fires a missile). If the broadcaster device has not received an event for this interactive control yet, there will be no state record for it, which can result in an error if it is queried (e.g., a control does not exist error). In order to avoid this issue, an empty control state record can be created for the interactive control (e.g., the fire missile button) and initialized to use default values (e.g., the fire missile button can be set to not pressed or false). In this way, the query will be successful (e.g., report that the button has not been pressed) and not return an error. This also saves time on the part of the programmer (e.g., the programmer does not have to create code to check for the existence of an interactive control before querying it).

Synchronization

In the technologies described herein, synchronization techniques can be applied to manage asynchronous events (e.g., when initializing the interaction manager for a live interactive video game stream). In some situations, a number of asynchronous tasks need to be performed between the broadcaster (e.g., broadcaster device 120) and the live interactive video game streaming service (e.g., live interactive video game streaming service 110). Some example asynchronous tasks that are performed by the broadcaster (e.g., by the interaction manager) include: connecting to the service, obtaining a list of viewers, scenes, groups, and/or controls from the service, creating groups, and assigning viewers to the groups.

In some implementations, the asynchronous tasks are tracked. Once all of the asynchronous tasks that are needed to begin streaming are complete (e.g., all of the asynchronous tasks needed to fully initialize the game interaction manager and broadcaster device and prepare them for streaming the video game stream), then the broadcaster can begin streaming the video game. In order to determine when the asynchronous tasks are complete, a setting (e.g., a flag or other type of setting) can be maintained. When the setting indicates the asynchronous tasks are complete (e.g., a flag that is set to true once all asynchronous tasks are complete, which can be tracked by the interaction manager), then the broadcaster can begin streaming.

Methods for Managing State of Interactive Controls

In the technologies described herein, interaction is managed for a live interactive video game stream. For example, interactive control events can be received from remote viewer devices, control state data structures can be maintained, and actions can be taken in video games based on the control state data structures.

Figure 4:
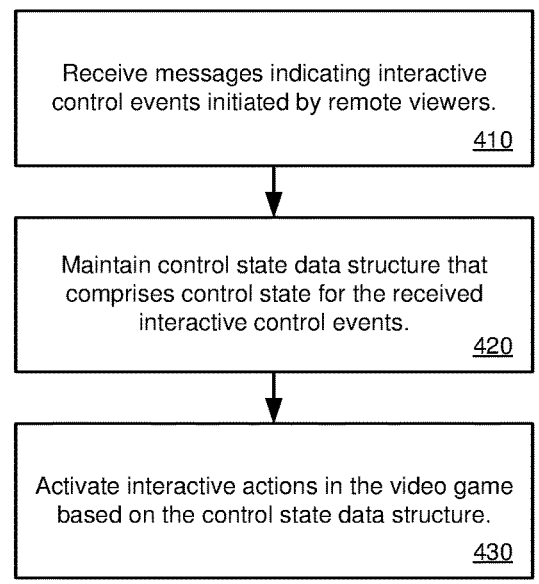
FIG. 4 is a flowchart of an example method for managing interaction for a live interactive video game stream.

FIG. 4 is a flowchart of an example method 400 for managing interaction for a live interactive video game stream. For example, the example method 400 can be performed by a computing device that is broadcasting the live interactive video game stream. For example, the example method 400 can be performed by an interaction manager (e.g., game interaction manager 122 running on broadcaster device 120).

At 410, messages are received indicating interactive control events initiated by remote viewers. The remote viewers are users viewing the live interactive video game stream on remote computing devices. For example, the messages can be received by broadcaster device 120 from one or more viewer devices 130 by way of live interactive video game streaming service 110. The interactive control events indicate the use of interactive controls by the viewers (e.g., button presses, joystick or controller movements, etc.). For example, an interactive control event can indicate that a specific button has been pressed (e.g., identified by a unique button name or another type of identifier for the button).

At 420, a control state data structure is maintained. The control state data structure comprises control state information representing the received interactive control events. The control state data structure maintains separate control state for each of a plurality of time periods, where each time period corresponds to one or more video frames. For example, the control state data structure can comprise a first snapshot of control state associated with a previous time period (e.g., a previous video frame), a second snapshot of control state associated with a current time period (e.g., a current video frame), and a third snapshot of control state associated with a next time period (e.g., a next video frame).

At 430, actions in the video game are activated based on the control state data structure. In some implementations, the actions are activated in real-time as the interactive controls are manipulated by the remote viewers (e.g., with less than one-second latency from the time the viewer selects the interactive control to the time the corresponding action is carried out in the video game). For example, a viewer viewing the live interactive video game stream on a remote viewer computing device can press an interactive control button and in real-time (e.g., with less than one-second latency) the interactive control button event can be sent to a broadcaster device where it is stored in the control state data structure and an action associated with the interactive control button is performed in the live streamed video game (e.g., the button may activate a sound in the video game, the button may drop an item or weapon in the video game, the button may activate a power-up in the video game, or the button may perform some other action in the video game).

Figure 5:
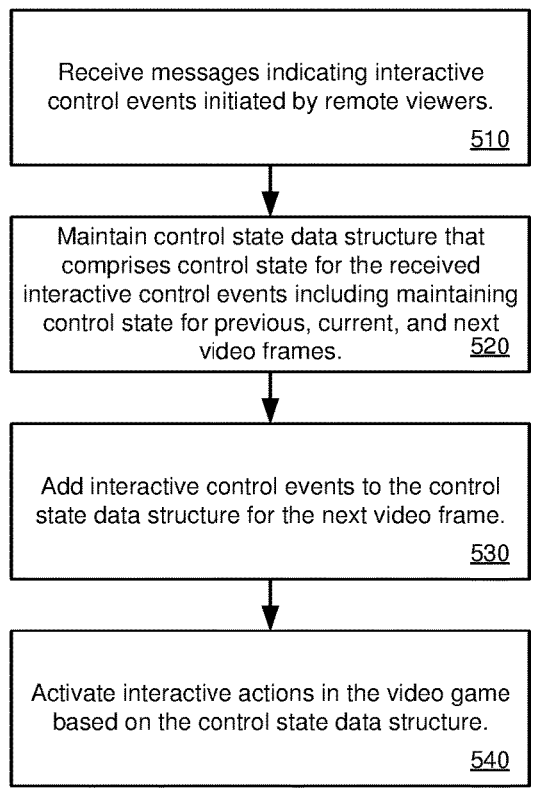
FIG. 5 is flowchart of an example method for managing interaction for a live interactive video game stream, including maintaining control state for previous, current, and next video frames.

FIG. 5 is a flowchart of an example method 500 for managing interaction for a live interactive video game stream. For example, the example method 500 can be performed by a computing device that is broadcasting the live interactive video game stream. For example, the example method 500 can be performed by an interaction manager (e.g., game interaction manager 122 running on broadcaster device 120).

At 510, messages are received indicating interactive control events initiated by remote viewers. The remote viewers are users viewing the live interactive video game stream on remote computing devices. For example, the messages can be received by broadcaster device 120 from one or more viewer devices 130 by way of live interactive video game streaming service 110. The interactive control events indicate the use of interactive controls by the viewers (e.g., button presses, joystick or controller movements, etc.). For example, an interactive control event can indicate that a specific button has been pressed (e.g., identified by a unique button name or another type of identifier for the button). In some implementations, the actions in the video game activated in real-time with less than one second latency from the time the viewer selects the interactive control to the time the corresponding action is carried out in the video game At 520, a control state data structure is maintained. The control state data structure comprises control state information representing the received interactive control events. The control state data structure maintains separate control state for each of a plurality of video frames. For example, the control state data structure can comprise a first snapshot of control state associated with a previous video frame, a second snapshot of control state associated with a current video frame, and a third snapshot of control state associated with a next video frame.

At 530, interactive control events are added to the control state data structure for the next video frame. For example, the messages indicating interactive control events received at 510 can be added to the control state data structure for the next video frame.

At 540, actions in the video game are activated based on the control state data structure. In some implementations, actions are activated in real-time as the interactive controls are manipulated by the remote viewers (e.g., with less than one-second latency from the time the viewer selects the interactive control to the time the corresponding action is carried out in the video game). For example, a viewer viewing the live interactive video game stream on a remote viewer computing device can press an interactive control button and in real-time (e.g., with less than one-second latency) the interactive control button event can be sent to a broadcaster device where it is stored in the control state data structure and an action associated with the interactive control button is performed in the live streamed video game (e.g., the button may activate a sound in the video game, the button may drop an item or weapon in the video game, the button may activate a power-up in the video game, or the button may perform some other action in the video game).

Computing Systems

Figure 6:
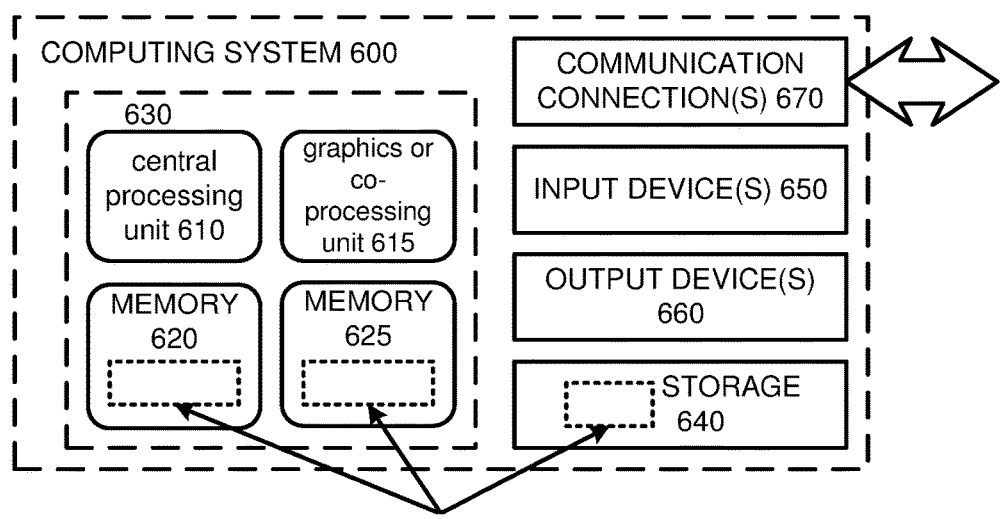
FIG. 6 is a diagram of an example computing system in which some described embodiments can be implemented.

FIG. 6 depicts a generalized example of a suitable computing system 600 in which the described technologies may be implemented. The computing system 600 is not intended to suggest any limitation as to scope of use or functionality, as the technologies may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more technologies described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more technologies described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 7:
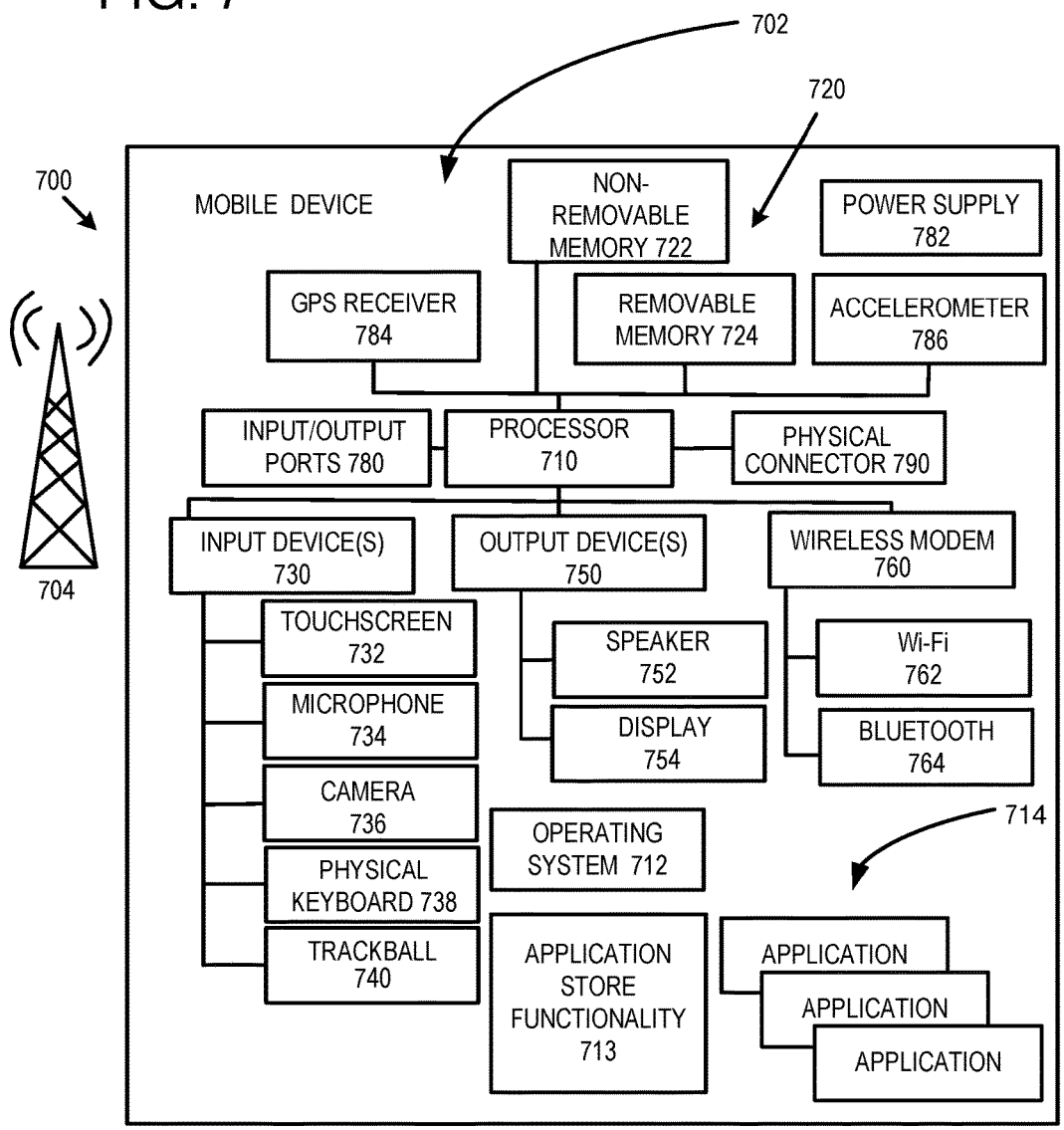
FIG. 7 is an example mobile device that can be used in conjunction with the technologies described herein.

FIG. 7 is a system diagram depicting an example mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular, satellite, or other network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications), or any other computing application. Functionality 713 for accessing an application store can also be used for acquiring and updating application programs 714.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

The input devices 730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 can comprise speech-recognition software as part of a voice user interface that allows a user to operate the device 700 via voice commands. Further, the device 700 can comprise input devices and software that allows for user interaction via a user's spatial gestures, such as detecting and interpreting gestures to provide input to a gaming application.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be deleted and other components can be added.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. By way of example and with reference to FIG. 7, computer-readable storage media include memory and storage 720, 722, and 724. The term computer-readable storage media does not include signals and carrier waves. In addition, the term computer-readable storage media does not include communication connections, such as 670, 760, 762, and 764.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
a processing unit; and
memory;
the processing unit configured to execute computer instructions performing operations for managing interaction for a live interactive video game stream, the operations comprising:
receiving messages indicating interactive control events initiated by remote viewers of the live interactive video game stream using interactive controls;
maintaining a control state data structure that comprises control state for the received interactive control events, wherein the control state data structure maintains separate control state for each of a plurality of time periods comprising a previous time period, a current time period, and a next time period, each time period corresponding to one or more video frames;
activating actions in a video game based on the control state data structure; and
based at least in part on receiving an indication that the video game is switching to the next time period:
moving the current time period control state to the previous time period control state;
moving the next time period control state to the current time period control state; and
clearing the next time period control state.

2. The computing device of claim 1, wherein the computing device is a broadcasting device that broadcasts the live interactive video game stream which is generated from the video game, wherein the interactive control events are received by a game interaction manager running on the broadcasting device from a live interactive video game streaming service, wherein the live interactive video game streaming service receives the interactive control events from the remote viewers operating viewer computing devices, and wherein the actions in the video game are activated in real-time with less than one second latency.

3. The computing device of claim 1, wherein the interactive control events are added to the control state data structure for the next time period.

4. The computing device of claim 1, wherein the control state data structure comprises:
   a first snapshot of control state associated with the previous time period;
   a second snapshot of control state associated with the current time period; and
   a third snapshot of control state associated with the next time period.

5. The computing device of claim 1, wherein maintaining the control state data structure that comprises control state for the received interactive control events comprises:
   aggregating interactive control events for a same interactive control across a plurality of viewers.

6. The computing device of claim 1, wherein maintaining the control state data structure that comprises control state for the received interactive control events comprises:
   maintaining separate control state for a same interactive control for each of a plurality of viewers.

7. The computing device of claim 1, wherein the actions are activated in the video game with less than one-second latency from when the interactive control events are initiated by the remote viewers.

8. The computing device of claim 1, wherein each time period is one video frame, and wherein the control state data structure comprises:
   a first snapshot of control state associated with a previous video frame;
   a second snapshot of control state associated with a current video frame; and
   a third snapshot of control state associated with a next video frame.

9. The computing device of claim 1, the operations further comprising:
   receiving a query for a specific interactive control;
   determining that a control state record does not exist for the specific interactive control;
   based at least in part on determining that the control state record does not exist:
      creating the control state record for the specific interactive control; and
      initializing the created control state record with default values, wherein the default values return a valid result when queried.

10. A method, implemented by a computing device, for managing interaction for a live interactive video game stream, the method comprising:
   receiving messages indicating interactive control events initiated by remote viewers of the live interactive video game stream using interactive controls;
   maintaining a control state data structure that comprises control state for the received interactive control events, wherein the control state data structure maintains separate control state for each of a plurality of time periods, each time period corresponding to one or more video frames;
   receiving a query for a specific interactive control;
   determining that a control state record does not exist for the specific interactive control;
   based at least in part on determining that the control state record does not exist:
      creating the control state record for the specific interactive control; and
      initializing the created control state record with default values, wherein the default values return a valid result when queried; and
   activating, in real-time, actions in a video game based on the control state data structure.

11. The method of claim 10, wherein the control state data structure maintains control state for each of a previous time period, a current time period, and a next time period, and wherein the interactive control events are added to the control state data structure for the next time period.

12. The method of claim 11, further comprising:
   based at least in part on receiving an indication that the video game is switching to the next time period:
      moving the current time period control state to the previous time period control state;
      moving the next time period control state to the current time period control state; and
      clearing the next time period control state.

13. The method of claim 10, wherein each time period is one video frame, and wherein the control state data structure comprises:
   a first snapshot of control state associated with a previous video frame;
   a second snapshot of control state associated with a current video frame; and
   a third snapshot of control state associated with a next video frame.

14. A computer-readable storage medium storing computer-executable instructions for causing a computing device to perform operations for managing interaction for a live interactive video game stream, the operations comprising:
   receiving messages indicating interactive control events initiated by remote viewers of the live interactive video game stream using interactive controls;
   maintaining a control state data structure that comprises control state for the received interactive control events, wherein the control state data structure maintains separate control state for each of a plurality of video frames, wherein the control state data structure comprises:
      a first snapshot of control state associated with a previous video frame;
      a second snapshot of control state associated with a current video frame; and
      a third snapshot of control state associated with a next video frame;
   adding the interactive control events to the control state data structure for the next video frame; and
   activating, in real-time, actions in a video game based on the control state data structure.

15. The computer-readable storage medium of claim 14, the operations further comprising:
   based at least in part on receiving an indication that the live interactive video game is switching to the next video frame:
      moving the current video frame control state to the previous video frame control state;

moving the next video frame control state to the current video frame control state; and clearing the next video frame control state.

16. The computer-readable storage medium of claim 15, wherein the actions are activated in the video game using the current video frame control state.

17. The computer-readable storage medium of claim 14, the operations further comprising:

receiving a query for a specific interactive control;

determining that a control state record does not exist for the specific interactive control;

based at least in part on determining that the control state record does not exist:

creating the control state record for the specific interactive control; and initializing the created control state record with default values, wherein the default values return a valid result when queried.

\* \* \* \* \*